Inventor:
Theodor A. Buchhold,
by Paul A. Frank
His Attorney.

Inventor:
Theodor A. Buchhold,
by Paul C. Frank
His Attorney.

United States Patent Office 3,514,524
Patented May 26, 1970

3,514,524
TRANSPOSED LOW TEMPERATURE STRIP ELECTRIC CABLE
Theodor A. Buchhold, Wiesbaden, Germany, assignor to General Electric Company, a corporation of New York
Continuation-in-part of application Ser. No. 574,777, Aug. 24, 1966. This application Apr. 17, 1968, Ser. No. 722,068
Int. Cl. H01b 11/06
U.S. Cl. 174—34          7 Claims

ABSTRACT OF THE DISCLOSURE

An apparatus and method for transmitting maximum power at very low temperatures through a cable or conductive strip. Elongated narrow ribbons of thin conductive material are folded to give conductive strips made of several thicknesses of the conductive ribbon material. These strips are formed by winding the ribbons upon a mandrel in a regularly progressing manner to form a helix. This material is then flattened and may be folded to give a transposed, folded strip. This operation may be carried forward several times to give a cable or strip of whatever capacity may be dsired.

---

My invention relates to an improved electrical cable and in particular to an improved electric cable for use at extremely low temperatures. This application in a continuation-in-part of my U.S. patent application Ser. No. 574,777, filed Aug. 24, 1966.

Conventional cables are limited in low temperature applications because in a solid conductor only a small percentage of the conductor has alternating current passing through it. In the case of round aluminum conductor, at 60 cycles and 20° K., the current flows through the outer skin only and penetrates to a depth of not more than 0.36 mm. Thus, all of the conductor except for such outer surface or skin is unused in the passage of current for power purposes. The conductors in this situation are exposed to magnetic fields and eddy currents are produced in them. One way to keep losses small is to subdivide each conductor into many thin parallel wires or strips. To obtain equal current distribution passage through magnetic fields, there wires must be transposed. Conventional methods of transposition are not suitable for very thin strips becaus of mechanical difficulties.

In order to build up cables made of thin wires, considerable insulation fill is used between the wires. As the number of wires is increased, the amount of such fill increases. Accordingly, in case of thin wires, a small percentage of the cross section of each cable is utilized to its maximum current carrying capability. Also, when thin wires are used, a very large cross section cable is needed for a given current capacity.

When current is passed through copper or aluminum at very low temperatures, the conductive material exhibits an exceedingly low resistance to passage of current. Thus, for a given potential the current passed is many times greater than that passed at normal temperature. Under these circumstances, other solutions to the problem of passing a maximum amount of current through a minimal cross section may be obtained.

It is an object of my invention to provide a cable construction which permits passage of a maximum amount of current through a minimal cross section of conductive material.

It is a further object of my invention to provide an arrangement to utilize current carrying material to its maximum possible capacity with minimal eddy currents.

It is a further object of my invention to provide a cable which is peculiarly adapted to transmission of power at low temperatures.

It is a further object of this invention to produce a light weight, readily handled, durable, small, low temperature cable which will carry relatively large amounts of electric power.

A further object of my invention is to provide a cable which can be buried underground and conduct very high currents of electricity with a minimum of repair.

In brief, my invention is an apparatus and method for transmitting maximum power at low temperatures through a cable or conductive ribbon. This is accomplisher by elongated long narrow ribbons of thin conducting material having very thin layers of insulating material applied to the ribbons. For example, in the case of aluminum ribbons the surface coating resulting from an anodizing process provides sufficient insulation. These ribbons are wound on a form or mandrel in a regularly progressing manner to form a helix or some similar shape, each helical ribbon being adjusted to and parallel to each other ribbon. After removal of the form, the member thus formed is flattened and folded longitudinally into a relatively thin, elongated, narrow strip. Such member is then likewise wound on a form in a regularly progressing manner as in the previous step. Again the form is removed and the resultant member is flattened and folded. These steps may be repeated any number of times until a composite strip of many layers is produced, the composite strip being wound in a helix or the like upon a final permanent form. The ends of the component strip are connected to form a single conductor. The final strip to be wound is always a composite of one or more of the preceding steps. A cable produced in this fashion will, at low temepratures, carry power many times that of a conventional cable of equal outer dimensions. At the point in the steps above where the tube is flattened, the flattened double layer can be rolled into a tube and used as a low temperature conductive element, if one so desires.

It is contemplated that cables produced in this manner finally may be circular, square, ellipsoid, rectangular or any other cross-sectional shape to facilitate winding to form a power transformer, motor, generator, or any other device using electrical cable.

The novel features which are believed to be characteristic of the invention are set forth in the appended claims. The invention, itself, however, together with further objects and advantages thereof may best be understood by reference to the following descripiton taken in conjunction with the accompanying drawings, in which:

Figure 1:
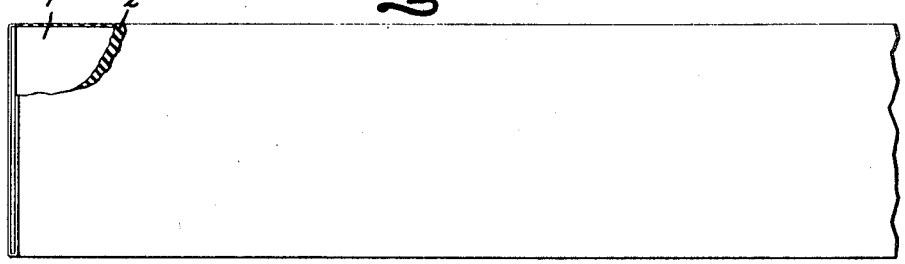
FIG. 1 shows a single ribbon of conductive material with insulation.

In FIG. 1, the ribbon 1 is very thin aluminum or copper material and has a layer 2 of insulation on its surface which may be sprayed onto the ribbon to form a thin layer of insulation about the conductive ribbon.

Figure 1A:
FIG. 1A shows a plurality of the single ribbons formed into an insulated sheet.

FIG. 1A shows a plurality of the narrow elongated ribbons 1 formed as a sheet 4. The individual ribbons are placed in parallel relation on an insulating substrate 5 and covered by a top insulating layer 13. In manufacturing the sheet the layer 13 may be formed by spraying a film of insulating material on the assembled parallel ribbons. In one sheet formed according to my invention the individual ribbons 1 were copper strips about 50 mils wide and 2 mils thick. Adjacent ribbons were spaced approximately 10 mils apart and supported on a substrate of polymeric material, namely, a Mylar film.

In another sheet formed in accordance with my invention, the ribbons 1 were 1 mil copper wires assembled in parallel relation and glued or joined together along their adjacent edges by means of an electrically insulating varnish.

Figure 2:
FIG. 2 shows ribbons of conductive material wound upon a tubular form.

FIG. 2 shows the appearance of a tubular member form 3 having wound upon it a sheet of ribbons of material shown in FIG. 1. A plurality of many ribbons 1 are wound in spaced side-by-side positions to form the sheet 4 until almost the complete surface of the form is covered. The carrier sheet 5 is over the mandrel and under the ribbons. Since these ribbons are wound in the form of a helix, a transposition is effected by the winding of FIG. 2. Induced voltages are cancelled by the transposition. Any eddy currents which may be induced upon the flat surface are limited in magnitude because of the small lateral surface of the ribbon. Eddy currents in the direction of the tubular radius are quite small since each ribbon is very thin. Thus, by the use of thin ribbons, eddy currents and the resulting power loss is largely eliminated. After ribbons have been wound upon the tubular surface (FIG. 2) the mandrel or form 3 is removed and sheet 4 comprising carrier 5 with ribbons 1 remain. Then the carrier and ribbons are flattened to form a strip in the manner shown in FIG. 3. When flattened the effectiveness of transposition is the same as in FIG. 2 since the ribbons run in opposite directions at any given cross-section and therefore magnetic fields created by current in the ribbons are in opposite directions. By use of such flattened strips several times the current of a single side may be passed under given conditions. However, this current-carrying capacity can be increased by following the process a few steps further.

It is noted that the result above may be obtained in a variety of ways, such as winding the ribbons onto a flat form and then placing adhesive insulating material onto the ribbons and flat form to produce much the same result as found in the preceding paragraph.

As the next step, one folds the flattened strip in two places 6, 7 so that the composite strip produced is of six thicknesses and wound in such a manner as to be transposed. The composite strips can now be wound upon a tubular form 8 shown in FIG. 5. This produces a cable element which can carry approximately six times as much current as the element shown in FIG. 1.

Although shown spaced apart for ease of illustration (FIG. 1) the ribbons are wound close to each other and the folded ribbons are as close to each other as possible for more uniform flux density.

Figure 3:
FIG. 3 shows the helical ribbons flattened.
Figure 4:
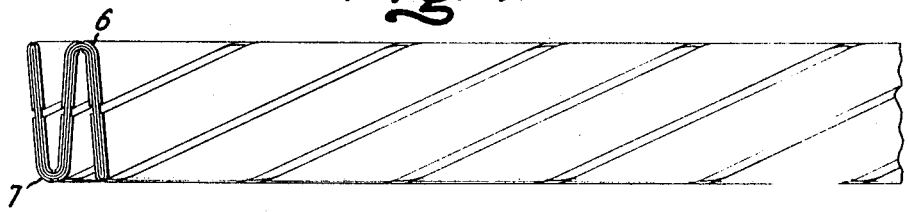
FIG. 4 shows the conductor after it has been folded.
Figure 5:
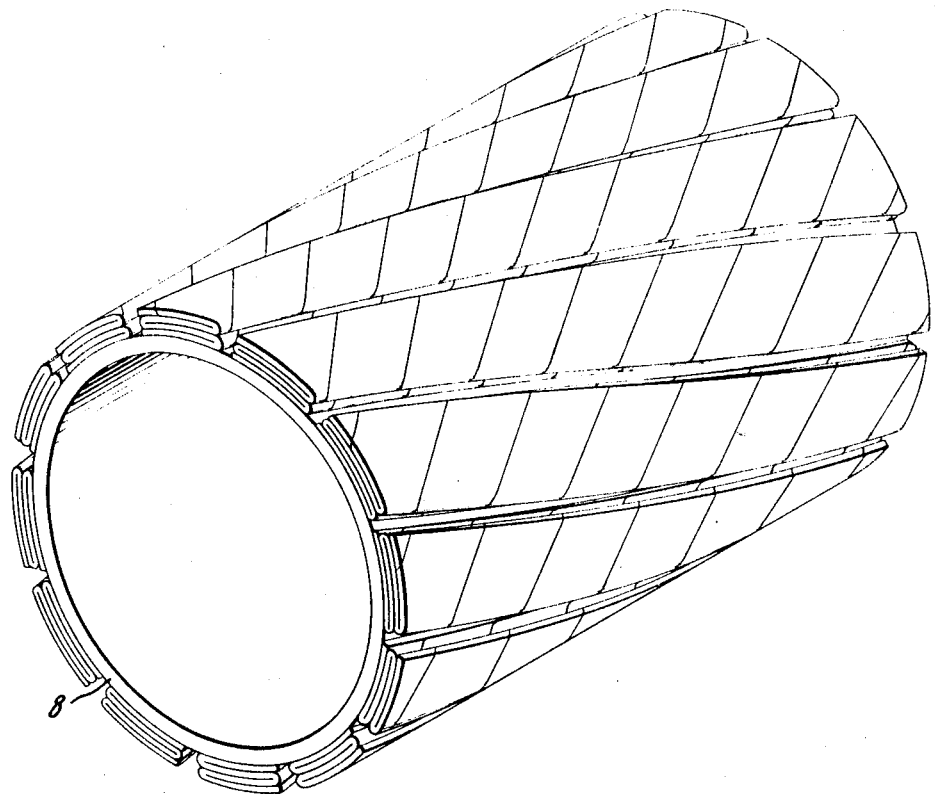
FIG. 5 shows a tubular form which has wound upon it composite conductive strips in helical fashion.

Clearly, if one desires, one can build up from the cable of FIG. 5 increasingly larger composite strips made similarly to the strips shown in FIGS. 3 and 4. In this way one can produce cables having considerable diameter and capable of transmitting as large an amount of electricl power as desired.

In the composite cable resulting from the steps above, the copper surface available is many times as much as shown in FIG. 2. The current and power carrying capability also is many times that shown in FIG. 1. Since the surface penetration of an electrical current at very low temperature (boiling point of hydrogen) in copper is on the order of 0.36 millimeter, it is clear that the ribbons can be very thin and by use of this apparatus and method a cable can be produced which at low temperatures will carry currents many times the amount of a conventional solid wire using a like amount of material.

The pitch of the windings of one stage and the next adjacent one may be different, i.e., the pitch of the winding used to form a composite conductive strip may be different from the pitch at which such composite strip is laid onto the next winding.

In cases where a component of magnetic flux is normal to the surface of the strip, a braided wire strip may be used instead of the solid ribbons. In this way there will be little eddy current caused by the flux lines passing through the surface of the braided wire strip because the individual insulated wires of the braided strip present very little surface to the flux lines taking into account the current carried.

While the foregoing examples specifically illustrate the application of my invention when wound onto a tubular form, it is to be understood that the last step of a cable winding can be upon a form of any shape, for example, a rectangular or square shape. This cable can be used in any of a variety of uses, for example, electrical transmission lines, generator and transformer windings.

It is further understood that while solid conductive ribbons have been illustrated and described, any type of conductve flat or braided wire or linear conductors will be subject to the same effect and the term "ribbon" or "strip" is here intended to include such conductors.

Although the invention has been illustrated and described as applied to several types of transposed electric cables, it is obvious that modifications of the arrangements may be made. Accordingly, my invention is to be considered as limited only by the scope of the appended claims.

What I claim as new and desire to secure by Letters Patent of the United States is:

1. An electric cable comprising a plurality of narrow elongated composite strips of conductive material, each in the form of a helix, the edges of one composite strip being spaced from the edges of adjacent composite strips, each of said composite strips being in the form of a sheet folded longitudinally, said sheet being a flattened tubular configuration of insulating material in which a plurality of longitudinal conductors are included, each conductor in the form of a helix and insulated from one another.

2. The combination of claim 1 in which each of said plurality of longitudinal conductors is a ribbon.

3. The combination of claim 2 in which each of said ribbons has a thin insulating coating.

4. The combination of claim 3 in which each of said ribbons having an insulated coating consists of anodized aluminum.

5. The combination of claim 1 in which each of said longitudinal conductors are wires of small diameter.

6. The combination of claim 1 in which said sheet is formed from a plurality of narrow strips, each narrow strip including a plurality of wires, each of said narrow strips helically wrapped in a regularly advancing manner so as to lie adjacent to one another and form a tubular configuration.

7. The combination of claim 1 in which said sheet includes a plurality of folds.

References Cited

UNITED STATES PATENTS 3,382,315    5/1968    Minnich _____ 174—34

LEWIS H. MYERS, Primary Examiner

A. T. GRIMLEY, Assistant Examiner

U.S. Cl. X.R.

174—114, 117, 130